(12) United States Patent
Tian et al.

(10) Patent No.: US 7,515,070 B2
(45) Date of Patent: Apr. 7, 2009

(54) METHOD AND DEVICE FOR CHECKING PLANE'S ENTRY INTO A DIVE AND ANTI-DIVE DEVICES FOR PLANES USING THE SAME

(76) Inventors: Yu Tian, No. 960, Shenlong Road, Shanghai 201516 (CN); Wenyan Jiang, No. 960, Shenlong Road, Shanghai 201516 (CN)

( * ) Notice: Subject to any disclaimer, the term of this patent is extended or adjusted under 35 U.S.C. 154(b) by 679 days.

(21) Appl. No.: 11/202,571

(22) Filed: Aug. 12, 2005

(65) Prior Publication Data
US 2007/0026757 A1   Feb. 1, 2007

(30) Foreign Application Priority Data
Jul. 29, 2005   (CN) .................... 2005 1 0028326

(51) Int. Cl.
| | |
|---|---|
| *G08B 23/00* | (2006.01) |
| *A63H 27/00* | (2006.01) |
| *B64C 13/20* | (2006.01) |
| *G08B 21/00* | (2006.01) |
| *G01C 21/00* | (2006.01) |
| *G01C 23/00* | (2006.01) |

(52) U.S. Cl. .................... 340/963; 446/34; 244/190; 340/945; 340/967; 340/974; 340/975

(58) Field of Classification Search ................ 340/963, 340/945, 967, 974, 975; 446/34; 244/190
See application file for complete search history.

(56) References Cited

U.S. PATENT DOCUMENTS

| | | | | | |
|---|---|---|---|---|---|
| 3,957,230 | A | * | 5/1976 | Boucher et al. | ............ 244/53 R |
| 4,968,879 | A | * | 11/1990 | Clark | .................... 250/227.11 |
| 7,219,861 | B1 | * | 5/2007 | Barr | ........................... 244/190 |
| 2005/0151023 | A1 | * | 7/2005 | Ribbe | ......................... 244/190 |

* cited by examiner

*Primary Examiner*—Daniel Wu
*Assistant Examiner*—Jack Wang
(74) *Attorney, Agent, or Firm*—Kaplan Gilman & Pergament LLP

(57) ABSTRACT

A method is disclosed for checking model planes entering into a dive, as well as an anti-dive method and apparatus. The method of checking planes includes installation of a first optical sensor in the upper part of the plane, with installation angle upwardly intersecting with the front of the plane at α degrees, that checks light intensity and outputs a first checked optical signal; installation of a second optical sensor in the bottom part of the plane, with its installation angle downwardly intersecting with the back of the plane at β degrees, which checks light intensity and outputs a second checked optical signal. A comparison is made between the first and second checked optical signals, and when the difference in light intensity is smaller than a threshold, a warning signal is sent out indicating that the plane has entered into a dive.

16 Claims, 5 Drawing Sheets

METHOD AND DEVICE FOR CHECKING PLANE'S ENTRY INTO A DIVE AND ANTI-DIVE DEVICES FOR PLANES USING THE SAME

BACKGROUND OF THE INVENTION

The present invention relates to a method for checking a plane whether it has entered into a diving state, and to an anti-dive device for planes making use of said checking method.

Model planes are a high-grade sports and recreation appliance. In comparison with remote control model boats or cars, operation of remote control planes necessitates certain skills and experiences. As a result, it is difficult for a beginner. Furthermore, since model planes fly in the air, it is liable to a plane crash due to improper operation, which could not only cause damage to properties, but also greatly spoil an operator's interest.

With regard to a beginner operating a model plane, improper operations are often made due to lack of skill in the start. When dangerous occasions such as a diving, and the like, occur, he or she often needs a relatively long time to think of a way to correct the dangerous situation for the plane. It is just such a consideration period that leads to the missing of the best opportunity to correct the situation, which may result in a crash of the model plane. More tragically, beginners may typically carry out operations that are even more unfavorable in an attempt to correct the dilemma. For example, when the nose is diving downward, a correct way is to pull up the operating lever controlling the elevators. If a beginner is in a nervous state of mood, he would probably make a mistake to push the lever, which would cause the plane to steepen its dive. Most frequent blunders in operation are often made when planes make a left or right turn. Due to planes' inclination, it causes a decreased orthographic projection area of planes' major wing, which results in a decrease in the vertical lift component of the wing. As a result, planes may descend while making a turn. At this time, if the operator keeps pushing the directional lever toward one side, planes may make their nose drop downward, entering into a spin and descending rapidly. The correct operation then would push the directional lever toward the opposite direction and slightly pull up the lift lever. Only can skilled and experienced operators make such operations with safety, otherwise, it is easy to make a crash.

Currently, nothing has been done to protect model planes from crashes due to improper operations by operators. The main reason behind it is that there have no effective methods to check whether model planes have entered into a diving state other than by the operator themselves.

SUMMARY OF THE INVENTION

Therefore, the present invention provides a method of checking planes entering into a dive, in order to solve the problem of checking the dive status in the prior art model planes.

The inventor has found that as far as the flight environment for model planes is concerned, above model planes is the sky, which is usually bright, while under them is the earth, which is relatively dark in comparison with the sky. When dive actions, such as spiral dives by planes, and the like, occur, the nose will drop toward the ground. Based on the foregoing finding, if the light quantity sensed by a nose can be checked continually, timely detection of the situation that the nose is dropping toward the ground can be made. Consequently, whether the plane is diving or not can be detected.

Therefore, based on the above principles, the present invention provides a method of checking planes entry into a dive, the method comprises the following steps:

installing a first optical sensor in the upper part of the plane, with its installation angle upwardly intersecting with the forward direction of the plane as $\alpha$ degrees, which is used to check light intensity and output a first checked optical signal;

installing a second optical sensor in the bottom part of the plane, with its installation angle downwardly intersecting with the backward direction of the plane as $\beta$ degrees, which is used to check light intensity and output a second checked optical signal;

comparing the first checked optical signal and the second checked optical signal, and when the difference between the light intensity represented by the first checked optical signal and that represented by the second checked optical signal is smaller than a threshold of light intensity differences, a warning signal to the effect that the plane has entered into a dive is sent out.

In the above method of checking planes entering into a dive, when the difference between the light intensity represented by the first checked optical signal and that represented by the second checked optical signal is smaller than a threshold of light intensity differences and such condition maintains for a certain period of time, a warning signal to the effect that the plane has entered into a dive is sent out.

In the above method of checking planes entering into a dive, the value of $\alpha$ is in the range of 10-60 degrees and the value of $\beta$ is in the range of 10-60 degrees.

In the above method of checking planes entering into a dive, the value of $\alpha$ is equal to the value of $\beta$.

In the above method of checking planes entering into a dive, both the value of $\alpha$ and the value of $\beta$ are 30 degrees.

In the above method of checking planes entering into a dive, the threshold of the light intensity difference is 0.

In the above method of checking planes entering into a dive, the first and the second optical sensors use any one of a photosensitive resistor, a photosensitive transistor, or a photosensitive cell.

The present invention also provides a device of checking planes entering into a dive, which comprises:

first optical sensor installed in the upper part of a plane, with its installation angle upwardly intersecting with the forward direction of the plane as $\alpha$ degrees, which is used to check light intensity and output a first checked optical signal;

a second optical sensor installed in the bottom part of the plane, with its installation angle downwardly intersecting with the backward direction of the plane as $\beta$ degrees, which is used to check light intensity and output a second checked optical signal;

a comparison unit coupled to the first and the second optical sensors, which is used to compare the first checked optical signal with the second checked optical signal and output the difference between the light intensity represented by the first checked optical signal and that represented by the second checked optical signal;

a warning signal generation unit, which is connected to the comparison unit, and when the light intensity difference output by the comparison unit is smaller than a threshold of light intensity differences, a warning signal to the effect that a plane undergoes a dive is sent out.

In the above device to check planes entering into a dive, it further comprises a timer unit connected to the warning signal generation unit, and when the light intensity difference output by the comparison unit is smaller than the threshold of light intensity differences, the warning signal generation unit actuates the timer unit to work, if the time period run by the timer unit reaches a certain maintained period of time, a warning signal to the effect that a plane has entered into a dive is sent out by the warning signal generation unit.

Based on the foregoing method of checking planes entering into a dive, the present invention also provides an anti-dive method for planes, the method comprises the following steps:

installing a first optical sensor in the upper part of the plane, with its installation angle upwardly intersecting with the forward direction of the plane as α degrees, which is used to check light intensity and output a first checked optical signal;

installing a second optical sensor in the bottom part of the plane, with its installation angle downwardly intersecting with the backward direction of the plane as β degrees which is used to check light intensity and output a second checked optical signal;

comparing the first checked optical signal and the second checked optical signal, and when the difference between the light intensity represented by the first checked optical signal and that represented by the second checked optical signal is smaller than a threshold of light intensity differences, a warning signal to the effect that the plane has entered into a dive is sent out;

turning off the response to control signals for the plane sent by the user, and turning off the plane's power concurrently;

continuously making comparison between the first checked optical signal with the second checked optical signal, and when the difference between the light intensity represented by the first checked optical signal and that represented by the second checked optical signal is larger than the threshold of light intensity differences, the response to sending a control signal for the plane to users is actuated.

In the above anti-dive method for planes, when the difference between the light intensity represented by the first checked optical signal and that represented by the second checked optical signal is smaller than the threshold of light intensity differences and such condition lasts for a certain maintained period of time, a warning signal to the effect that the plane has entered into a dive is sent out.

Based on the foregoing device for checking planes entering into a dive, the present invention also provides an anti-dive device for planes which comprises:

a first optical sensor installed in the upper part of a plane, with its installation angle upwardly intersecting with the forward direction of the plane as α degrees, which is used to check light intensity and output the first checked optical signal;

a second optical sensor installed in the bottom part of the plane, with its installation angle downwardly intersecting with the backward direction of the plane as β degrees, which is used to check light intensity and output the second checked optical signal;

a comparison unit connected to the first optical sensor and the second optical sensor, which is used to compare the first checked optical signal with the second checked optical signal and output the difference between the light intensity represented by the first checked optical signal and that represented by the second checked optical signal;

a warning signal generation unit connected to the comparison unit, and when the light intensity difference output by the comparison unit is smaller than a threshold of light intensity differences, a warning signal to the effect that a plane has entered into a dive is sent out; and a control unit connected to the warning signal generation unit, and when it receives a signal sent by the warning signal generation unit, it turns off the response to the control signal for planes sent by the user, and in the meantime, it also turns off the plane's power supply; when the warning signal dies out, the response to the control signal for the plane sent by the users is activated.

In the foregoing anti-dive device for planes, it further comprises a timer unit connected to the warning signal generation unit. When the light intensity difference output by the comparison unit is smaller than the threshold of light intensity differences, the warning signal generation unit actuates the timer unit to work. When the time counting by the timer unit reaches a certain maintained period of time, a warning signal to the effect that a plane has entered into a dive is sent out by the warning signal generation unit.

As described above, the present invention provides a method of checking planes entering into a dive by using the planes' environmental status when flying so as to pave the way for protecting planes from dives.

DETAILED DESCRIPTION OF THE INVENTION

As described previously, the present invention takes advantages of the characteristics of the brighter sky and the darker ground. Whether a plane has entered into a dive can be ascertained by determining the plane's flight status by optical sensors installed on the plane.

Figure 1:
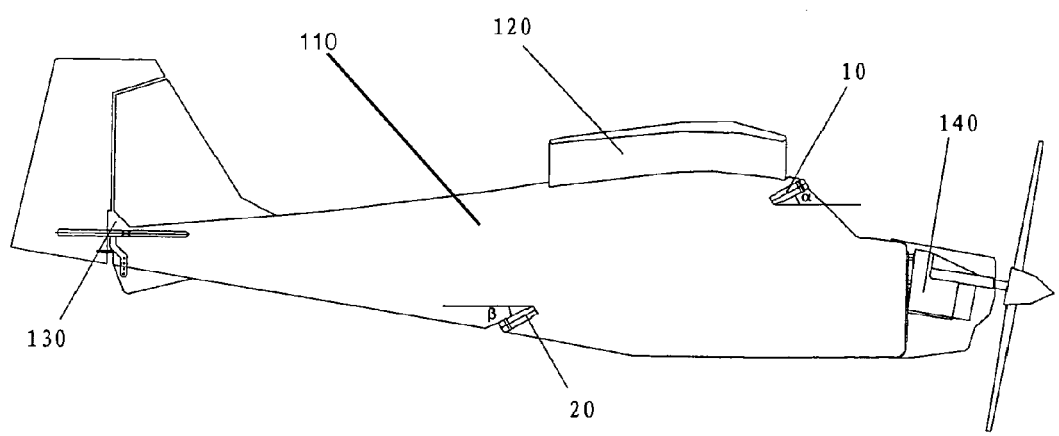
FIG. 1 is a schematic diagram of a model plane to which the method and device to check planes entering into a dive according to the present invention has been applied.

Referring to FIG. 1, this is a structural diagram of a model plane to which the method and device to check planes entering into a dive according to the present invention has been applied. No structural changes of the model plane has been made by the present invention. The plane with a T-tail wing is used herein for description purposes, however, it is to be understood that principles of the present invention may also apply to other types of model planes, such as model planes with V-tail wings, and the like.

Figure 2:
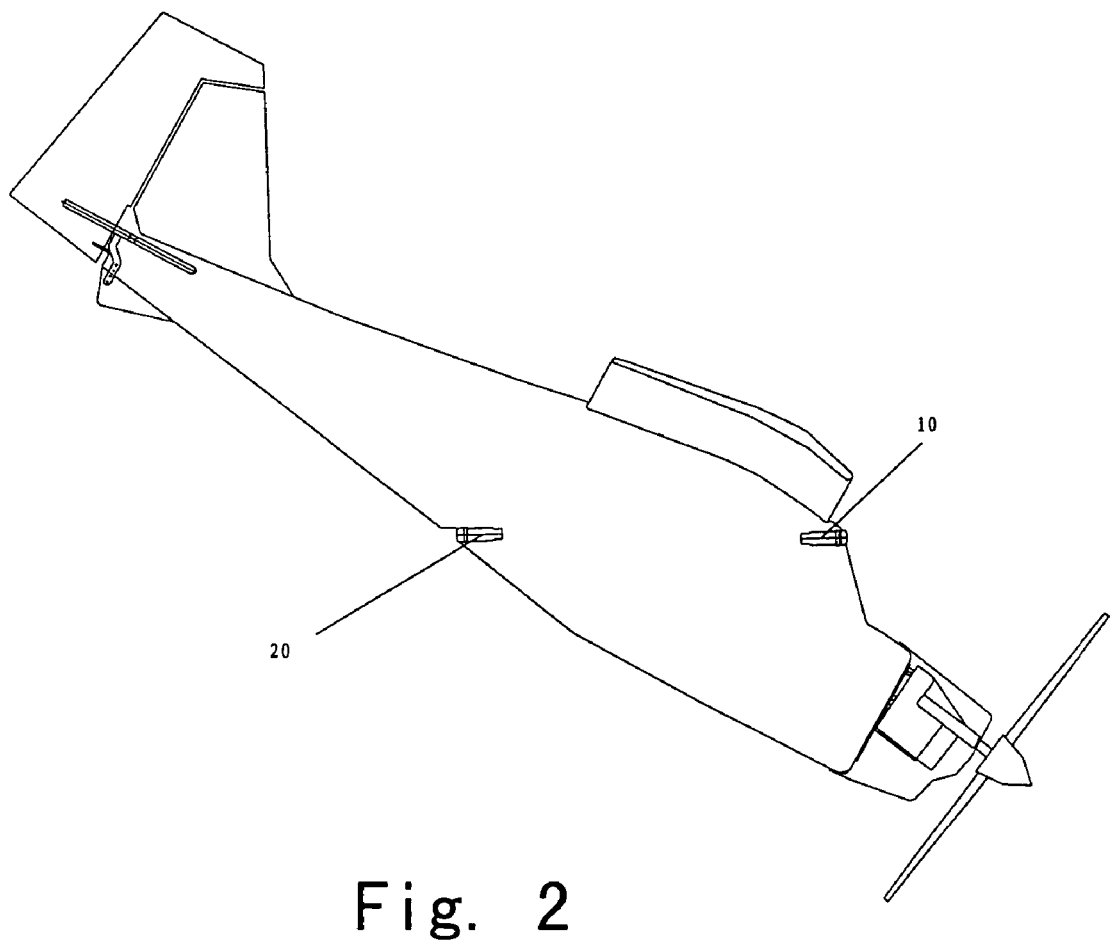
FIG. 2 is a schematic diagram showing the model plane entering into a dive and sending out a warning signal.

The model plane shown in FIG. 1 includes a fuselage 110, a wing 120, a T-tail wing 130, a power units 140, etc. According to the principles of the present invention, two optical sensors, a first optical sensor 10 and a second optical sensor 20, are installed on the model plane to detect whether the radio has entered into a dive. The first optical sensor 10 is installed in the upper part of the fuselage 110. Its installation angle upwardly intersects with the forward direction of the plane and the angle against the horizontal plane is α. The second optical sensor 20 is installed in the bottom part of the fuselage 110. The installation angle downwardly intersects with the backward direction of the plane and the angle against the horizontal plane is β. When the plane flies in a normal way, e.g. making a parallel flight against the basic ground, the first optical sensor 10 receives light from the sky due to its installation angle while the second optical sensor 20 receives light from the ground due to its installation angle. As described previously, the light intensity of the light from the sky is generally stronger than that of the light from the ground. When the plane makes fall actions, for example, diving, etc. due to certain reasons such as operations, wind directions, etc., as shown in FIG. 2, its nose would be downward and the plane would lose its horizontal position. At this time, both the α value showing the angle of the first optical sensor 10 installed on the plane against the horizontal plane and the β value showing the angle of the second optical sensor 20 installed on the plane against the horizontal plane decrease, even change to zero or negative. Under such circumstances, the light intensity of the light received by both the first optical sensor 10 and the second optical sensor 20 will change. That is to say, the light intensity of the light received by the first optical sensor 10 will gradually become weaker whilst the light intensity of the light received by the second optical sensor 20 will become stronger. As a result, the light intensity difference between the two becomes smaller. When the light intensity difference is smaller than a certain threshold, presumption can be made that the diving of the plane has fallen into a diving tendency and a warning signal to the effect that the plane has entered into a dive should be sent out.

In some typical embodiments, the α value for the installation angle of the first sensor 10 is selected from the range of 10-60 degrees while the β value for the installation angle of the second sensor 20 is selected from the range of 10-60 degrees. The selected values for α and β may be different. The threshold of light intensity differences may, however, be determined based on selections of α and β values and through experimental means. Of course, the selected value for α and β may be the same and in the preferred example the threshold of light intensity differences is set as 0, meaning the state where the plane's diving angle reaches the α value may be defined as the plane has entered into a dive. Experiments have demonstrated that values for α and β are preferably in the range from 20 to 40 degrees, and the most preferably 30 degrees.

Taking into consideration measurement errors by the optical sensors due to effects of other outside light sources and thus issuing erroneous warning signals, a time factor may be also incorporated in the method of checking planes entering into a dive according to the present invention. That is, when the difference of the light intensity checked by the first optical sensor 10 and the second optical sensor 20 is smaller than the threshold of light intensity differences is detected, measurement for a continued time period shall be carried out. The warning signal to the effect that the plane has entered into a dive shall be sent out only when such condition lasts for a certain maintained period of time. The length of the maintained period of time shall be determined based on practical demand. It may last, for example, 2-8 seconds, and most preferably 2.5 seconds.

Figure 3:
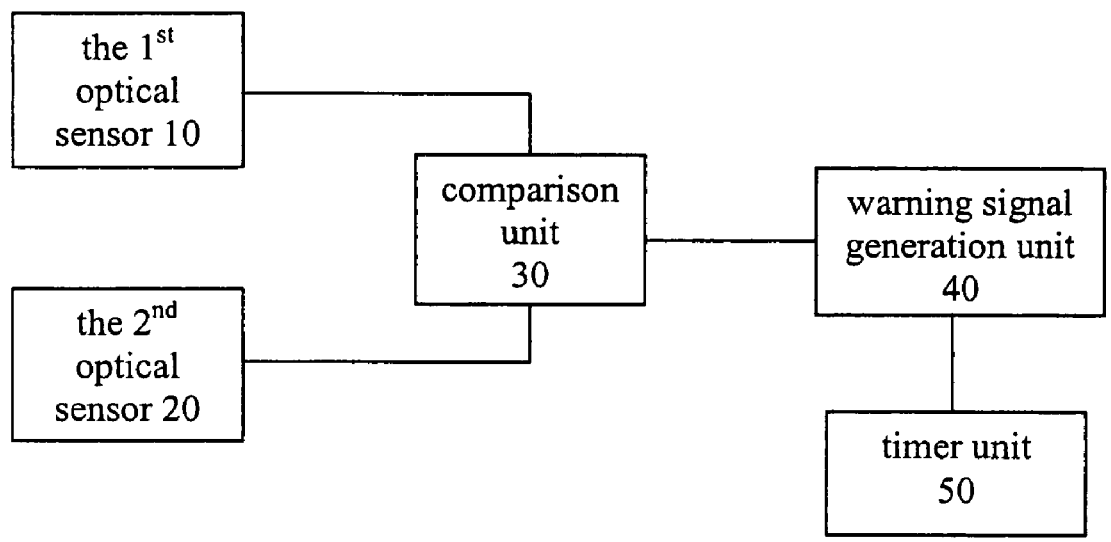
FIG. 3 is a functional block diagram showing the device of checking planes entering into a dive according to the present invention.

The following is a further description of the device that embodies the method of checking planes entering into a dive according to the present invention by referring to FIG. 3. As shown in FIG. 3, the checking device according to the present invention comprises: a first optical sensor 10, a second optical sensor 20, a comparison unit 30, a warning signal generation unit 40, and a timer unit 50. The first optical sensor 10 and the second optical sensor 20 are the same as those shown in FIG. 1 and both connected to the comparison unit 30. As described above, the first optical sensor 10 checks the light intensity of lights and outputs the first checked optical signal expressing the light intensity after conversion. The second optical sensor 20 checks the light intensity of lights and outputs the second checked optical signal expressing the light intensity after conversion. The comparison unit 30 respectively receives the first checked optical signal output by the first optical sensor 10 and the second checked optical signal output by the second optical sensor 20, and outputs the signal of light intensity differences represented by the two checked optical signals.

The warning signal generation unit 40 is connected to the comparison unit 30. It receives the signal of light intensity differences output by the comparison unit 30 and analyzes the signal. When it determines that the light intensity difference is smaller than the above said threshold of light intensity differences, the warning signal generation unit 40 generates and sends out a warning signal.

A timer unit 50 is incorporated in this embodiment. The timer unit 50 is connected to the warning signal generation unit 40. When the light intensity difference output by the comparison unit 30 is smaller than the threshold of light intensity differences, the warning signal generation unit 40 actuates the timer unit 50 to work. After the timer unit 50 starts time counting and when the time counting by the timer unit 50 reaches a certain maintained period of time, the warning signal generation unit 40 sends out a warning signal to the effect that the plane has entered into a dive.

It should be understood that the timer unit 50 herein used is just an optional feature.

Figure 4A:
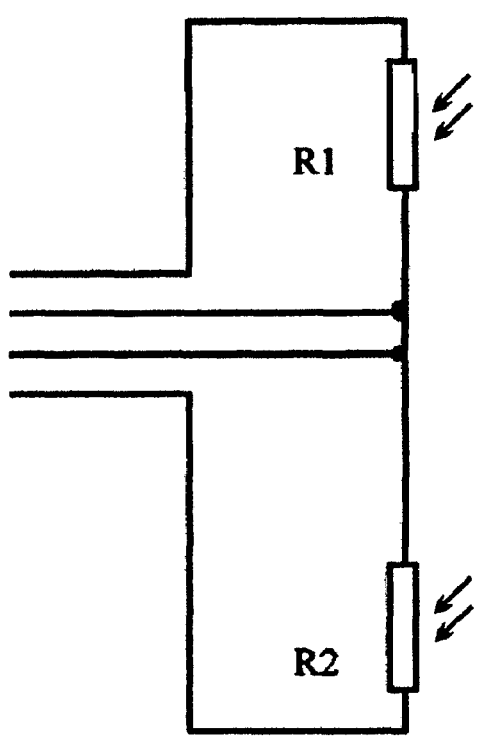
FIG. 4A-FIG. 4C illustrate various circuit connections of optical sensors.
Figure 4B:
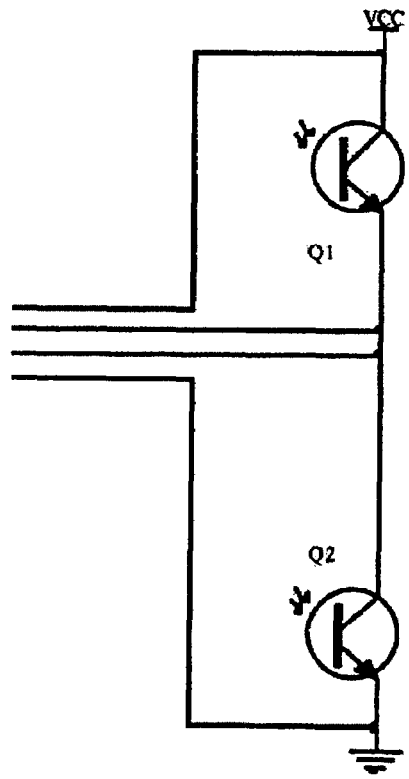
Figure 4C:
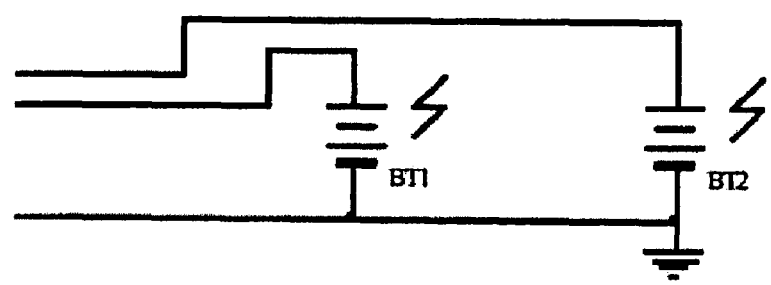

In the above embodiment, the first optical sensor 10 and the second optical sensor 20 may be any commonly-used photosensitive elements available, such as photosensitive resistors, photosensitive transistors, or photosensitive cells, etc. FIG. 4A-FIG. 4C each shows the circuit structure using photosensitive resistors, photosensitive transistors, and photosensitive cells as the optical sensors respectively.

In FIG. 4A, R1 and R2 refer to the first photosensitive resistor and the second photosensitive resistor respectively. The first photosensitive resistor R1 and the second photosensitive resistor R2 are connected in series. Either end and the middle junctions of the series circuits of the photosensitive resistor are linked respectively with the follow-up comparison unit.

In FIG. 4B, Q1 and Q2 refer to the first photosensitive transistor and the second photosensitive transistor respectively. The emitting electrode of the first photosensitive transistor Q1 is connected to the collecting electrode of the second photosensitive transistor Q2. The base electrodes of both the first photosensitive transistor Q1 and the second photosensitive transistor Q2 are left blank, without use. The connections between the collector electrode and the emitter electrode of the first photosensitive transistor Q1 and the collector electrode of the second photosensitive transistor Q2, and the emitter electrode of the second photosensitive transistor Q2 are linked respectively with the follow-up comparison unit.

In FIG. 4C, BT1 and BT2 refer to the first photosensitive cell and the second photosensitive cell respectively. The negative terminals of both the first photosensitive cell BT1 and the second photosensitive cell BT2 are grounded whilst their positive terminals are connected to the follow-up comparison unit.

With the method and device for checking planes entering into a dive available, the present invention further provides an anti-dive method and device to be implemented for model planes.

After obtaining a warning signal to the effect that the plane has entered into a dive, the model plane first turns off the response to various control signals for the plane sent through a remote control unit by the user, in order to restore all surfaces of the rudders controlling the plane's turning to their medium-level, and in the meantime, turns off the plane's power supply. In practical operation, a relatively simple and effective way to protect the plane from a dive is to turn off the power supply and turn the surface of the rudder controlling the plane's turning to the medium-point level.

Then, comparison of the first checked optical signal with the second checked optical signal is continued. When the difference between the light intensity represented by the first checked optical signal and that represented by the second checked optical signal is larger than the threshold of light intensity differences, the response to the sent out control signals from the user is activated, in order to return control of the plane to the user.

In a preferred embodiment, in addition to suspending the user's ability to control the plane, automatic control of the plane can also be implemented, in order to get the plane out of the dive dilemma more quickly and more effectively. For example, while turning off the plane's power, an effort to pull the lever of the elevator is made at the same time, in order to control the model plane and restore laterally and longitudinally horizontal status.

It should be understood that a variety of ways to get the model plane out of the dive status can be exercised by the user in his or her practical operation, and all these ways can be used spontaneously and incorporated in the present invention. Therefore, there is no need to make any in-depth or detailed descriptions for them.

Figure 5:
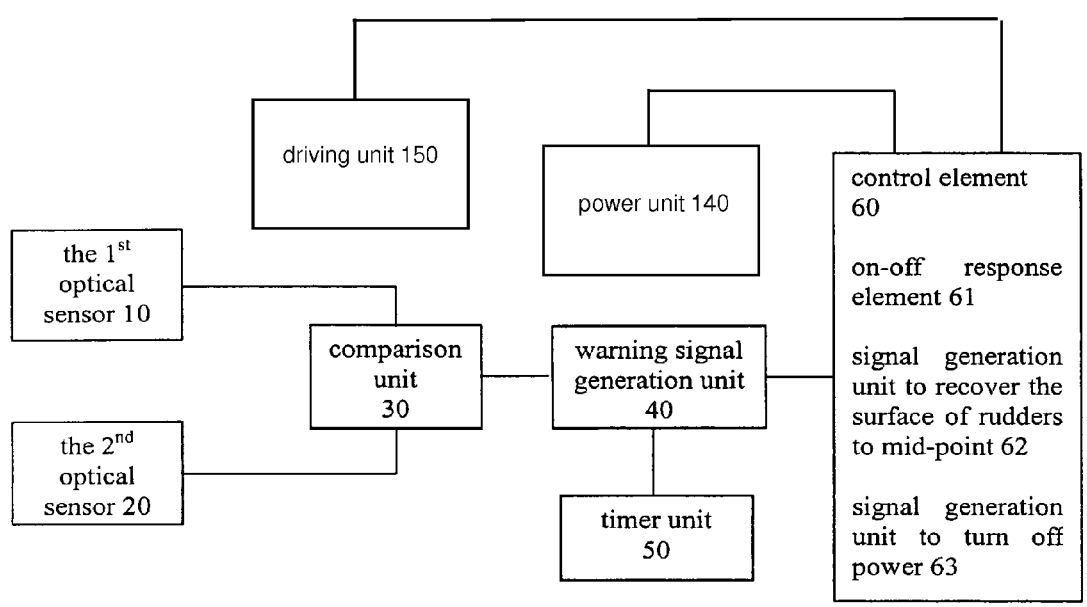
FIG. 5 is a functional block diagram of the anti-dive device for planes according to the present invention.

The following is a description of the structure and operating principle of the anti-dive device for planes of the present invention with reference to FIG. 5.

As shown in FIG. 5, the device for checking plane's entering into a dive is the same as the structure shown in FIG. 3. In the anti-dive device for planes, a control unit is added. The control unit 60 is connected to the warning signal generation unit 40 and it receives warning signals sent out by the warning signal generation unit 40. Under normal conditions where no warning signals are sent out, the control unit 60 receives operating instructions for model planes sent out by users through remote controller. For example, after receiving an instruction to increase power supply, the control unit 60 sends a signal to increase power to a power unit 140; when receiving an instruction to make a turning, the control unit 60 sends a corresponding rudder controlling signal to a rudder face controlling and driving unit 150. In this aspect, the structure of he control unit 60 is the same as the traditional general structure, and therefore, no further detail is needed.

When the control unit 60 receives a warning signal sent by the warning signal generation unit 40, the control unit 60 first turns off the response to control signals for planes sent by the user, in order to restore all surfaces of rudders controlling the plane's turning to the medium-point level, and in the meantime, turns off the plane's power. When the warning signal dies out, the control unit 60 activates the response to control signals for planes sent by the user.

In order to carry out all these operations, the control unit 60 should comprise an on-off response element 61, a signal generation unit 62 to generate a restore-the-surface-of-rudders-to-medium-point-level signal, and a signal generation unit 63 to generate a turnoff-power signal.

The invention claimed is:

1. A method of checking planes entering a dive, comprising steps of:
    installing a first optical sensor in the upper part of the said plane, with its installation angle upwardly intersecting with the forward direction of the plane as α degrees, which checks light intensity and outputs a first checked optical signal;
    installing a second optical sensor in the bottom part of the plane, with its installation angle downwardly intersecting with the backward direction of the plane as β degrees, which checks light intensity and output a second checked optical signal;
    comparing the first checked optical signal and the second checked optical signal, and if the difference between the light intensity represented by the first checked optical signal and that represented by the second checked optical signal is smaller than a threshold of light intensity differences, a warning signal to the effect that the plane has entered into a dive is sent out.

2. The method of checking planes entering a dive according to claim 1, wherein when the difference between the light intensity represented by the first checked optical signal and that represented by the second checked optical signal is smaller than a threshold of light intensity differences and such condition lasts for a certain maintained period of time, a warning signal to the effect that the plane has entered into a dive is sent out.

3. The method of checking planes entering a dive according to claims 1, wherein the value of α is in the range of 10-60 degrees and the value of β is in the range of 10-60 degrees.

4. The method of checking planes entering a dive according to claim 3, wherein both the value of α and the value of β are 30 degrees.

5. A device of checking planes entering a dive comprising:
    a first optical sensor installed in the upper part of the plane, with its installation angle upwardly intersecting with the forward direction of the plane as α degrees, which checks light intensity and outputs a first checked optical signal;
    a second optical sensor installed in the bottom part of the plane, with its installation angle downwardly intersecting with the backward direction of the plane as β degrees which checks light intensity and outputs a second checked optical signal;
    a comparison unit connected to the first optical sensor and the second optical sensor and outputs a difference between the light intensity represented by the first checked optical signal and that represented by the second checked optical signal;
    a warning signal generation unit connected to the comparison unit, which sends out a warning signal to the effect that a plane has entered into a dive is sent out when the light intensity difference output by the comparison unit is smaller than a threshold of light intensity differences.

6. The device of checking planes entering a dive according to claim 5, further comprising:
    a timer unit connected to the warning signal generation unit and actuated to work thereby when the light intensity difference output by the comparison unit is smaller than the threshold of light intensity differences, and when the time counting by the timer unit reaches a certain maintained period of time, a warning signal to the effect that a plane has entered into a dive is sent out by the warning signal generation unit.

7. The device of checking planes entering a dive according to claims 5, wherein the value of α is in the range of 10-60 degrees and the value of β is in the range of 10-60 degrees.

8. The device of checking planes entering a dive according to claim 7, wherein both the value of α and the value of β are 30 degrees.

9. An anti-dive method for planes, comprising steps of:
    installing a first optical sensor in the upper part of a plane, with its installation angle upwardly intersecting with the forward direction of the plane as α degrees, which checks light intensity and outputs a first checked optical signal;

installing a second optical sensor in the bottom part of the plane, with its installation angle downwardly intersecting with the backward direction of the plane as β degrees, which checks light intensity and outputs a second checked optical signal;

comparing the first checked optical signal with the second checked optical signal and when the difference between the light intensity represented by the first checked optical signal and that represented by the second checked optical signal is smaller than a threshold of light intensity differences, a warning signal to the effect that a plane has entered into a dive is sent out;

turning off the response to control signals for the plane sent by the user and turning off plane's power supply in the meantime;

continually comparing the first checked optical signal with the second checked optical signal and when the difference between the light intensity represented by the first checked optical signal and that represented by the second checked optical signal is larger than the threshold of light intensity differences, the response to control signals for the plane sent by the user is activated.

10. The anti-dive method for planes according to claim 9, wherein when the difference between the light intensity represented by the first checked optical signal and that represented by the second checked optical signal is smaller than a threshold of light intensity differences and such condition lasts for a certain maintained period of time, a warning signal to the effect that the plane has entered into a dive is sent out.

11. The anti-dive method for planes according to claims 9, wherein the value of α is in the range of 10-60 degrees and the value of β is in the range of 10-60 degrees.

12. The anti-dive method for planes according to claim 11, wherein both the value of α and the value of β are 30 degrees.

13. An anti-dive device for planes comprising:
a first optical sensor installed in the upper part of the plane, with its installation angle upwardly intersecting with the forward direction of the plane as α degrees, which checks light intensity and outputs a first checked optical signal;
a second optical sensor installed in the bottom part of the plane, with its installation angle downwardly intersecting with the backward direction of the plane as β degrees, which checks light intensity and outputs a second checked optical signal;
a comparison unit connected to the first optical sensor and the second optical sensor, which compares the first checked optical signal with the second checked optical signal and outputs the difference between the light intensity represented by the first checked optical signal and that represented by the second checked optical signal;
a warning signal generation unit connected to the comparison unit, which sends out a warning signal to the effect that a plane has entered into a dive when the light intensity difference output by the comparison unit is smaller than a threshold of light intensity differences; and
a control unit connected to the warning signal generation unit, which turns off the response to control signals for the plane sent by the user after receiving a signal sent out by the warning signal generation unit, the control element, and, in the meantime, turns off the plane's power supply, and which activates the response to control signals for the plane sent by the user when the warning signal dies out.

14. The anti-dive device for planes according to claim 13, further comprising:
a timer unit connected to the warning signal generation unit and actuated to work thereby when the light intensity difference output by the comparison unit is smaller than the threshold of light intensity differences, and when the time counting by the timer unit reaches a certain maintained period of time, a warning signal to the effect that a plane has entered into a dive is sent out by the warning signal generation unit.

15. The anti-dive device for planes according to claims 13, wherein the value of α is in the range of 10-60 degrees and the value of β is in the range of 10-60 degrees.

16. The anti-dive device for planes according to claim 15, wherein both the value of α and the value of β are 30 degrees.

* * * * *